United States Patent [19] [11] 4,269,749
Marriott et al. [45] May 26, 1981

[54] METHOD OF IMPARTING SALT AND/OR MECHANICAL STABILITY TO AQUEOUS POLYMER MICROSUSPENSIONS

[75] Inventors: Robert C. Marriott; Frank W. Kristal; Robert M. Julier, all of Midland, Mich.

[73] Assignee: The Dow Chemical Company, Midland, Mich.

[21] Appl. No.: 34,786

[22] Filed: Apr. 30, 1979

[51] Int. Cl.$^3$ ............................................. C08L 33/00
[52] U.S. Cl. ........................................... 260/29.6 MQ
[58] Field of Search ............................... 260/29.6 MQ

[56] References Cited

U.S. PATENT DOCUMENTS

| 3,264,242 | 8/1966 | Teot | 260/29.6 MQ |
| 3,264,243 | 8/1966 | Knieriem | 260/29.6 MQ |
| 3,397,071 | 8/1968 | Knieriem | 260/29.6 MQ |

Primary Examiner—Harry Wong, Jr.

[57] ABSTRACT

An improved method of imparting salt and/or mechanical stability to an aqueous polymer microsuspension comprising admixing with the microsuspension a stabilizing amount of a mono- and dialkyldiphenyl ether sulfonate surfactant composition comprising, by weight, at least about 35 weight percent, based on the total weight of the composition, of at least one dialkyldiphenyl ether sulfonate.

13 Claims, No Drawings

METHOD OF IMPARTING SALT AND/OR MECHANICAL STABILITY TO AQUEOUS POLYMER MICROSUSPENSIONS

BACKGROUND OF THE INVENTION

1. Field of the Invention

This invention relates to aqueous polymer microsuspensions. In one aspect, the invention relates to stabilizing these microsuspensions to various salt and mechanical conditions while in another aspect, the invention relates to stabilizing these microsuspensions with alkyldiphenyl ether sulfonate surfactant compositions.

2. Description of the Prior Art

Surfactant compositions comprising alkyldiphenyl ether sulfonates are known in the art. A series of such compositions are manufactured by The Dow Chemical Company under the trademark DOWFAX ®. Representative of these compositions are mixtures containing greater than 70 weight percent monoalkylated, essentially disulfonated diphenyl oxide. Both the chain length of the alkyl groups and the neutralizing cation of the sulfonate group can vary to convenience. These compositions have a plurality of known utilities including imparting salt and mechanical stability to various aqueous polymer microsuspensions.

SUMMARY OF THE INVENTION

According to this invention, the salt and/or mechanical stability imparted to an aqueous polymer microsuspension by a mono- and dialkyldiphenyl ether sulfonate surfactant composition is improved wherein at least about 35 weight percent of the composition is at least one dialkyldiphenyl ether sulfonate.

DETAILED DESCRIPTION OF THE INVENTION

The surfactant compositions used in the practice of this invention comprise at least about 35 weight percent, preferably at least about 40 weight percent, and most preferably at least about 50 weight percent, of at least one dialkyldiphenyl ether sulfonate. These sulfonates are of the general formula

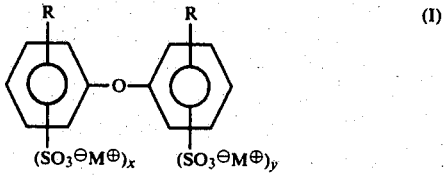

wherein each R is an alkyl radical and each R can be the same or different, each $M^{\oplus}$ is a hydrogen, alkali metal ion, alkaline earth metal ion or ammonium ion and each $M^{\oplus}$ can be the same or different, and x and y are individually 0 or 1 with the proviso that x or y is 1 and the average value of $\Sigma(x+y)$ for all (I) is at least about 1.7 and preferably at least about 1.8. R is preferably an alkyl radical of between 4 and about 18 carbon atoms, and more preferably of between about 10 and about 18 carbon atoms. The alkyl radicals of R can be linear, branched or cyclic but the linear and branched radicals are preferred. The $M^{\oplus}$ ammonium ion radicals are of the formula

(II)

wherein R' is a hydrogen, $C_1$–$C_4$ alkyl or $C_1$–$C_4$ hydroxyalkyl radical and each R' can be the same or different. The illustrative $C_1$–$C_4$ alkyl and hydroxyalkyl radicals include: methyl, ethyl, propyl, isopropyl, butyl, hydroxymethyl, hydroxyethyl, etc. Typical ammonium ion radicals include: ammonium ($N^+H_4$), methylammonium ($CH_3N^+H_3$), ethylammonium ($C_2H_5N^+H_3$), dimethylammonium (($CH_3)_2N^+H_2$), methylethylammonium ($CH_3N^+H_2C_2H_5$), trimethylammonium (($CH_3)_3N^+H$), dimethylbutylammonium (($CH_3)_2N^+HC_4H_9$), hydroxyethylammonium ($HOCH_2CH_2N^+H_3$), methylhydroxyethylammonium ($CH_3N^+H_2CH_2CH_2OH$), etc. $M^+$ is preferably an alkali metal ion and more preferably an ion of sodium or potassium.

The remainder of the surfactant composition typically comprises at least one monoalkyldiphenyl ether sulfonate. This material is similar in structure to the sulfonate of Formula I except it has but one R group which can be attached to either nucleus and, like the sulfonate of Formula I, the R can be ortho, meta or para to the ether oxygen. The monoalkyl diphenyl ether sulfonate is present in no more than about 65 weight percent, preferably no more than about 60 weight percent, and most preferably no more than about 50 weight percent, of the composition. The surfactant compositions of this invention can be essentially void of any monoalkyl diphenyl ether sulfonate, and other materials as well, and thus be essentially 100 weight percent dialkyldiphenyl ether sulfonate.

The dialkyldiphenyl ether sulfonates here used are known compounds and are readily prepared and formulated into surfactant compositions by any one of a number of known methods. One well-known and accepted method is taught by Steinhauer et al., U.S. Pat. No. 2,990,375 and comprises a series of steps, the first step comprising preparing an alkyldiphenyl ether by reacting an olefin or an olefin halide, such as tripropylenes, tetrapropylenes, pentapropylenes or dodecyl bromide, with diphenyl ether at a temperature between about 50° C. and about 100° C. in the presence of a Friedel-Crafts catalyst, such as aluminum chloride. The reaction mixture is washed with water to remove the catalyst, the phases separated, and the organic-rich phase subjected to distillation to obtain a fraction consisting of a mixture of monoalkylated diphenyl ether and dialkylated diphenyl ether. The number of alkyl substituents per diphenyl ether molecule can be controlled by adjusting the relative proportions of the reactants. Alternatively, the distillation can be performed so as to separate the mono- and dialkylate diphenyl ethers from one another and from lower or higher boiling ingredients after which the mono- and dialkylated diphenyl ether fractions can be combined at a desirable ratio.

The mixture of mono- and dialkyldiphenyl ethers is subsequently reacted with a sulfonating agent, such as chlorosulfonic acid or sulfur trioxide, while the reactants are dissolved in an inert liquid polychlorinated aliphatic hydrocarbon solvent, such as methylene chloride, carbon tetrachloride, perchloroethylene, tetrachloroethane, ethylene dichloride, etc., and at a reaction temperature between about 20° C. and about 60° C. The sulfonating reaction proceeds readily with the introduction of one sulfonic acid radical per aromatic nucleus such that an average of at least about 1.7, and preferably at least about 1.8, of the aromatic nuclei present in the reaction mixture are sulfonated.

Upon completion of the sulfonation reaction, the mixture is neutralized and made slightly alkaline, e.g., is brought to a pH value between 7 and 8, with a base, such as sodium hydroxide, potassium hydroxide, an amine, or an aqueous solution of the same, to convert the mono- and dialkyldiphenyl ether sulfonic acids to the corresponding salts. The aqueous and organic layers are then separated and the sulfonates contained in the aqueous layer. The sulfonates can be in admixture with lesser amounts of inert materials, principally alkali sulfates, e.g., sodium sulfate or potassium sulfate if these were the neutralizing materials, with lesser amounts of alkali chlorides and water. The presence of these inert materials in small quantities does not adversely affect this invention. Further description and alternative steps for preparing the dialkyldiphenyl ether sulfonates and the surfactant compositions of this invention are disclosed in Steinhauer et al., U.S. Pat. No. 2,990,375.

The surfactant compositions or formulations of this invention are used in the same manner as known surfactant compositions. They can be admixed with either a polymer microsuspension precursor, prior to polymerization, or to the microsuspension itself, as a post-additive, after polymerization. If added after the polymer microsuspension is formed, the compositions impart an increased or improved degree of mechanical and/or salt (electrolyte) stability. If added to a polymer microsuspension precursor, the compositions of this invention not only impart improved mechanical and/or salt stability to the final polymer microsuspension, but also aid in the production of the polymer microsuspension particles without increasing the concentration of the surfactant composition. Moreover, when added to a polymer microsuspension precursor, the surfactant composition can be used to influence ultimate particle size by merely adjusting the mono-:dialkylate ratio, or in other words, without having to increase or decrease the concentration of the surfactant composition. To what extent and in what direction (larger or smaller) particle size will be influenced is dependent on several factors among which include kind of polymer precursor and initial loading of surfactant.

A stabilizing amount of surfactant composition is added to the aqueous polymer microsuspension. A typical minimum amount is about 0.05 weight percent and preferably about 0.5 weight percent based on the weight of the microsuspension. Practical considerations, such as convenience and economics, are the only limitations upon the maximum amount of surfactant composition that can be added but a maximum amount of about 5 weight percent and preferably of about 2 weight percent is generally employed.

"Aqueous polymer microsuspension" here means polymer particles dispersed in an aqueous phase continuum wherein the polymer is in the solid state as contrasted to the viscous liquid state. These microsuspensions are sometimes known as aqueous polymer dispersions. Polymers suitably microsuspended or dispersed include any normally solid (e.g., melting above about 20° C.) thermoplastic resin whose degradation point is at a somewhat higher temperature than its melting point. The polymers include, among others, polyolefins; diene rubbers such as polybutadiene-1,3 and copolymers of 1,3-butadiene with copolymerizable monomers such as styrene, acrylonitrile, etc.; vinyl resins, such as vinyl pyridine; olefin-vinyl copolymers; polyamides; epoxy resins; homopolymers and copolymers of monovinylidene aromatic monomers; acrylic resins; polyesters; polycarbonates; polyurethanes; etc. Vinyl microsuspensions, such as those produced from at least one vinyl monomer, particularly benefit from this invention. Exemplary microsuspensions include those prepared from styrene/butadiene, ethyl acrylate, polyvinyl chloride, polyvinyl acetate, etc. Further illustration of microsuspensions that benefit from this invention is given by Warner et al. U.S. Pat. No. 4,123,403. The typical particle size (diameter) of these microsuspensions range from about 150 angstroms to about 10,000 angstroms, and preferably between about 500 and about 3,000 angstroms.

The following are illustrative embodiments of this invention. Unless indicated otherwise, all parts and percentages are by weight.

SPECIFIC EMBODIMENTS

Examples 1–2 and Controls A–B

The microsuspensions here used were prepared by first charging a reactor with deionized water (70 parts per 100 parts monomer), Versonol ®-120 (0.0125 parts per 100 parts monomer, trisodium salt of N-(hydroxyethyl)-ethylenediaminetriacetic acid (an organic chelating agent manufactured by The Dow Chemical Company) and a surfactant (1.35 parts per 100 parts monomer, reported in Table I). The contents of the reactor were heated to about 80° C. and then 588.9 g/hr for 3 hours and subsequently 294.4 g/hr for 3 hours of monomer was charged to the reactor. The monomer consisted of 54 parts styrene, 44 parts butadiene, 2 parts acrylic acid and 6 parts carbon tetrachloride. After the 6 hours of monomer charging, 120.9 g/hr for 6 hours of aqueous mix (with a 15-minute aqueous prestart) was added to the reactor. The aqueous mix consisted of 28 parts deionized water, 0.005 parts Versonol ®-120, 0.3 parts surfactant (same as used in first charge), 0.6 parts sodium persulfate, and 0.12 parts sodium hydroxide. Upon completion of the addition of the aqueous mix, the reaction was allowed to subside over 3 hours.

Four surfactant compositions were prepared and employed. The first two compositions were outside the scope of this invention while the latter two were within the scope of this invention. All the compositions consisted of a mixture of two alkyldiphenyl ether sulfonates. The first composition, Control A, consisted of 100 percent monoalkyldiphenyl ether sulfonate. The second formulation, Control B, consisted of an 80:20 mixture of mono- and dialkyldiphenyl ether sulfonates. The third and fourth formulations, Examples 1 and 2, consisted of 50:50 and 20:80 mixtures, respectively, of mono- and dialkyldiphenyl ether sulfonates. In each composition, the alkyl substituents (R) were branched $C_{12}$ tetrapropylene radicals, the counterion ($M^{\oplus}$) was sodium, and the degree of sulfonation ($\Sigma(x+y)$) was equal to or greater than 1.7.

Various tests and measurements were made upon the microsuspensions prepared with the various surfactant compositions and the data is reported in Table I.

TABLE I
SALT AND MECHANICAL STABILITY OF A STYRENE-BUTADIENE MICROSUSPENSION STABILIZED WITH VARIOUS ALKYL DIPHENYL ETHER SULFONATES

| Con/ Ex. | mono-/di- ratio | Surfactant (Total moles) | Stability Salt | Mechanical | Particle Size (A) |
|---|---|---|---|---|---|
| A | 100/0 | 0.062 | 0.5 | 3.85 | 1090 |
| B | 80/20 | 0.06 | 0.5 | 0.25 | 1070 |
| 1 | 50/50 | 0.055 | >25 | 0.1 | 1250 |
| 2 | 20/80 | 0.047 | >25 | 0.02 | 1740 |

Salt stability was measured by adding milliliters of a 10 percent solution of sodium chloride to a 25 g sample of microsuspension until there was evidence of agglomeration. Accordingly, the numbers in the salt stability column of Table I express a quantity in milliliters of the 10 percent sodium chloride solution that was added to the 25 g microsuspension sample to cause agglomeration. The larger the number, the more salt stable the microsuspension.

Mechanical stability was measured by stirring a 200 g sample of microsuspension on a Hamilton Beach mixer for 20 minutes at high speed. The microsuspension was then filtered through a 100 mesh screen to gather the residue (grams of waste). Accordingly, the figures in the mechanical stability column of Table I represent the grams of waste collected on the 100 mesh screen. All controls and examples were run at essentially the same high speed. Here, the smaller the number, the more mechanically stable the microsuspension.

Comparison of the control data to the example data exhibits the improved properties of this invention. The mechanical stability and the salt stability increased as the concentration of the dialkyldiphenyl ether sulfonate increased in the surfactant composition. This increase was achieved despite a reduction in the total moles of surfactant composition used. Also of note is the increase in particle size with the increase of dialkylate content in the surfactant composition.

Examples 3-5 and Controls C-D

The microsuspensions here tested for salt stability were prepared by charging a 1-gallon, stainless steel reactor with 100 parts styrene (700 g), 0.05 parts per 100 parts styrene of sodium hydroxide (10 percent, 3.5 g), 1 part active surfactant per 100 parts monomer, 0.01 active parts per 100 parts styrene of Versenex® 80 (1 percent, 7 g, pentasodium salt of diethylenetriaminepentaacetic acid (an organic chelating agent manufactured by The Dow Chemical Company)), and sufficient deionized water (1235 g) to make a microsuspension of 35 percent solids. The reactor was then purged thoroughly with nitrogen gas and the reactor heated under positive pressure and with agitation to about 70° C. When the reactor temperature reached about 70° C., 0.5 active parts per 100 parts styrene $K_2S_2O_8$ (5 percent, 70 g) was added and the reactor maintained at about 70° C. for about 4 hours. Subsequent to the 4-hour reaction time, the reactor was cooled to room temperature and the microsuspension recovered.

The five surfactant compositions prepared and used in these examples and controls consisted of the same alkyldiphenyl ether sulfonates as those used in Examples 1-2 and Controls A-B, i.e., each R was a branched $C_{12}$ tetrapropylene radical, $M^\oplus$ was sodium, and $\Sigma(x+y)$ was equal to or greater than 1.7. The salt stability measurements were made in the same fashion as in the preceding examples and controls. The results are reported in Table II.

TABLE II
SALT STABILITY OF A POLYSTYRENE MICROSUSPENSION PREPARED AND STABILIZED WITH VARIOUS ALKYLDIPHENYL ETHER SULFONATES

| Con/ Ex. | Mono-/di- Ratio | Salt Stability |
|---|---|---|
| C | 100/0 | 8.0 |
| D | 80/20 | 2.0 |
| 3 | 50/50 | 0.3 |
| 4 | 20/80 | 0.5 |
| 5 | 0/100 | 1.0 |

Comparison of the control data to the example data demonstrates the improved salt stability imparted to the microsuspension prepared with the surfactant compositions of this invention. The particle sizes of all the microsuspensions were approximately the same.

Although the invention has been described in considerable detail by the preceding examples and controls, the detail is for purpose of illustration only and is not to be construed as a limitation upon the scope of this invention as defined by the appended claims.

What is claimed is:

1. In a method of imparting salt and/or mechanical stability to an aqueous polymer microsuspension by admixing with the microsuspension a stabilizing amount of a mono- and dialkyldiphenyl ether sulfonate surfactant composition, the improvement wherein at least about 35 weight percent of the composition is at least one dialkyldiphenyl ether sulfonate of the formula

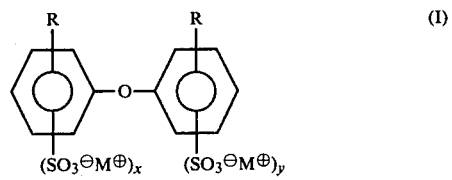

wherein:
each R is an alkyl radical and each R can be the same or different,
each $M^\oplus$ is a hydrogen, alkali metal ion, alkaline earth metal ion or ammonium ion and each $M^\oplus$ can be the same or different, and
x and y are individually 0 or 1 with the proviso that x or y is 1 and the average value of $\Sigma(x+y)$ for all (I) is at least about 1.7.

2. The method of claim 1 wherein R is an alkyl radical of between 4 and about 18 carbon atoms.

3. The method of claim 2 wherein $M^\oplus$ is an alkali metal ion.

4. The method of claim 3 wherein R is an alkyl radical of between 10 and about 18 carbon atoms.

5. The method of claim 4 wherein $M^\oplus$ is a sodium ion.

6. The method of claim 1 wherein at least about 40 weight percent of the composition is (I).

7. The method of claim 1 wherein at least about 50 weight percent of the composition is (I).

8. The method of claim 1 wherein the composition is present in an amount of at least about 0.05 weight percent of the microsuspension.

9. The method of claim 1 wherein the composition is present in an amount of at least about 0.5 weight percent of the microsuspension.

10. The method of claim 1, 4, 6 or 9 wherein the microsuspension comprises polystyrene or polystyrene-butadiene polymers.

11. The method of claim 1, 4, 6 or 9 wherein the composition is admixed with the microsuspension as a post-additive.

12. The method of claim 1, 4, 6 or 9 wherein the composition is admixed with a polymer microsuspension precursor of the aqueous polymer microsuspension.

13. The method of claim 1, 4, 6 or 9 wherein the microsuspension comprises a polyvinyl chloride polymer.

* * * * *